United States Patent
Komoriya

(10) Patent No.: US 11,166,332 B2
(45) Date of Patent: Nov. 2, 2021

(54) COMMUNICATION APPARATUS AND CONTROL METHOD THEREOF

(71) Applicant: CANON KABUSHIKI KAISHA, Tokyo (JP)

(72) Inventor: Mitsuo Komoriya, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/745,754

(22) Filed: Jan. 17, 2020

(65) Prior Publication Data

US 2020/0252986 A1  Aug. 6, 2020

(30) Foreign Application Priority Data

Jan. 31, 2019 (JP) .............................. JP2019-015981

(51) Int. Cl.
*H04W 4/00* (2018.01)
*H04W 76/15* (2018.01)
(Continued)

(52) U.S. Cl.
CPC ............. *H04W 76/15* (2018.02); *H04W 4/80* (2018.02); *H04W 12/06* (2013.01); *H04W 80/02* (2013.01); *H04W 84/12* (2013.01); *H04W 88/06* (2013.01)

(58) Field of Classification Search
CPC ..... H04W 76/15; H04W 88/06; H04W 12/06; H04W 4/80

(Continued)

(56) References Cited

U.S. PATENT DOCUMENTS

| 6,169,906 | B1 * | 1/2001 | Bruckert | ............... | H04W 84/08 |
| | | | | | 455/518 |
| 8,107,478 | B2 * | 1/2012 | Naito | ...................... | H04L 47/14 |
| | | | | | 370/394 |

(Continued)

FOREIGN PATENT DOCUMENTS

JP  2018042058 A  3/2018

OTHER PUBLICATIONS

Extended European Search Report issued in European Appln. No. 20151628.3 dated Apr. 1, 2020.

(Continued)

*Primary Examiner* — Marceau Milord
(74) *Attorney, Agent, or Firm* — Rossi, Kimms & McDowell LLP

(57) ABSTRACT

A communication apparatus comprising a first communication unit configured to perform wireless LAN communication and a second communication unit configured to perform another communication different from the wireless LAN communication, receives, from another communication apparatus using the second communication unit, a request of information used when the other communication apparatus provides, by wireless LAN communication, the communication apparatus with a communication parameter necessary for performing communication with a wireless LAN access point using the first communication unit, transmits, in response to the reception of the request, the requested information to the other communication apparatus using the second communication unit, and starts the first communication unit after the reception of the request.

14 Claims, 12 Drawing Sheets

(51) Int. Cl.
*H04W 4/80* (2018.01)
*H04W 12/06* (2021.01)
*H04W 80/02* (2009.01)
*H04W 84/12* (2009.01)
*H04W 88/06* (2009.01)

(58) Field of Classification Search
USPC .............................................. 370/338, 312
See application file for complete search history.

(56) References Cited

U.S. PATENT DOCUMENTS

| | | | | |
|---|---|---|---|---|
| 2006/0095954 | A1* | 5/2006 | Buckley | H04L 63/08 726/2 |
| 2009/0191911 | A1* | 7/2009 | Wilson | H04M 1/72403 455/556.1 |
| 2011/0211511 | A1* | 9/2011 | Bakthavathsalu | H04W 52/0254 370/311 |
| 2013/0309971 | A1* | 11/2013 | Kiukkonen | H04W 12/08 455/41.2 |
| 2014/0068719 | A1* | 3/2014 | Kiukkonen | H04W 12/50 726/4 |
| 2014/0075523 | A1* | 3/2014 | Tuomaala | H04L 63/083 726/6 |
| 2014/0195654 | A1* | 7/2014 | Kiukkonen | H04W 8/00 709/220 |
| 2014/0206346 | A1* | 7/2014 | Kiukkonen | H04W 52/0229 455/426.1 |
| 2015/0113621 | A1* | 4/2015 | Glickfield | H04W 12/068 726/7 |
| 2016/0066254 | A1* | 3/2016 | Colby | G07C 9/00309 455/41.1 |
| 2016/0226861 | A1* | 8/2016 | Takae | H04W 52/0245 |
| 2016/0255574 | A1* | 9/2016 | Takae | H04W 48/18 726/7 |
| 2016/0330774 | A1* | 11/2016 | Takae | H04W 8/183 |
| 2017/0034864 | A1* | 2/2017 | Kawakami | H04W 76/14 |
| 2017/0257895 | A1* | 9/2017 | Kawakami | H04L 63/10 |
| 2017/0353981 | A1 | 12/2017 | Lee | |
| 2017/0359846 | A1* | 12/2017 | Kawakami | H04W 88/04 |
| 2018/0054854 | A1* | 2/2018 | Liu | H04W 12/06 |
| 2018/0124595 | A1* | 5/2018 | Park | H04W 8/20 |
| 2018/0212936 | A1 | 7/2018 | Terao | |
| 2019/0140908 | A1* | 5/2019 | Ma | H04L 41/12 |
| 2019/0215878 | A1 | 7/2019 | Goto | |
| 2019/0364492 | A1* | 11/2019 | Azizi | H04W 48/16 |
| 2020/0146081 | A1* | 5/2020 | Cho | H04W 84/20 |

OTHER PUBLICATIONS

"Device Provisioning Protocol Specification" Wi-fi Alliance. Apr. 2018: pp. 1-124. Version 1.1. XP055670685. Retrieved from the Internet: URL:https://www.wi-fi.org/download.php?file=/sites/default/files/private/Device Provisioning Protocol Specification v1.1 I.pdf [retrieved on Feb. 20, 2020].

* cited by examiner

COMMUNICATION APPARATUS AND CONTROL METHOD THEREOF

BACKGROUND OF THE INVENTION

Field of the Invention

The present invention relates to a communication apparatus that performs wireless communication, a control method thereof, and a non-transitory computer-readable storage medium.

Description of the Related Art

In recent years, there are increasing cases in each of which a wireless communication function is installed in an electronic device such as a digital camera, a printer, a mobile phone, and a smartphone, and the electronic device is connected to a wireless LAN such as Wi-Fi. In order to connect an electronic device to a wireless LAN, it is necessary to set various types of communication parameters for an encryption method, an encryption key, an authentication method, an authentication key, and the like. As a technique for facilitating setting of these communication parameters, a communication parameter setting protocol (a Wi-Fi Device Provisioning Protocol, which is referred to as a DPP hereinafter) has been formulated. Japanese Patent Laid-Open No. 2018-42058 discloses setting communication parameters using the DPP.

In the DPP, a mechanism for securely executing setting of communication parameters and wireless connection processing using a public key cypher exchanged by BLE (Bluetooth Low Energy) or the like is defined. In the DPP, a configurator that provides communication parameters provides an enrollee that receives the communication parameters with information called a connector which is information necessary for connecting to an access point. The enrollee uses the connector provided from the configurator to execute connection processing for generating a key used for authentication and communication with the access point.

When setting communication parameters between the enrollee and the configurator using BLE and executing connection processing to a wireless LAN (WLAN), the enrollee needs to start firmware (FW) for BLE communication and FW for WLAN communication. For example, if the FW for WLAN communication is started when the apparatus is turned on and the operation time of the FW becomes long, the power consumption by the FW increases. As a result, particularly when a battery is used as a power source, a decrease in remaining battery capacity could be a problem.

SUMMARY OF THE INVENTION

According to an aspect of the present invention, there is provided a technique for reducing the power consumption of a communication apparatus by shortening the operation time of firmware for wireless LAN communication.

According to one aspect of the present invention, there is provided a communication apparatus comprising a first communication unit configured to perform wireless LAN communication and a second communication unit configured to perform another communication different from the wireless LAN communication, comprising: a receiving unit configured to receive, from another communication apparatus using the second communication unit, a request of information used when the other communication apparatus provides, by wireless LAN communication, the communication apparatus with a communication parameter necessary for performing communication with a wireless LAN access point using the first communication unit; and a first transmitting unit configured to, in response to the reception of the request by the receiving unit, transmitting the requested information to the other communication apparatus using the second communication unit; and a starting unit configured to start the first communication unit after the reception of the request by the receiving unit.

According to another aspect of the present invention, there is provided a communication apparatus comprising a first communication unit configured to perform wireless LAN communication and a second communication unit configured to perform BLE communication, comprising: a first receiving unit configured to receive an ADV_EXT_IND signal from another communication apparatus using the second communication unit; a transmitting unit configured to, if the ADV_EXT_IND signal is received by the first receiving unit, transmit an AUX_SCAN_REQ signal to the other communication apparatus in a channel based on channel information included in the ADV_EXT_IND signal regardless of whether an AUX_ADV_IND signal has been received from the other communication apparatus; a second transmitting unit configured to receive an AUX_SACN_RSP signal from the other communication apparatus; and a providing unit configured to provide, using the first communication unit, the other communication apparatus with a communication parameter necessary for performing communication with a wireless LAN access point.

According to another aspect of the present invention, there is provided a control method of a communication apparatus comprising a first communication unit configured to perform wireless LAN communication and a second communication unit configured to perform another communication different from the wireless LAN communication, the method comprising: receiving, from another communication apparatus using the second communication unit, a request of information used when the other communication apparatus provides, by wireless LAN communication, the communication apparatus with a communication parameter necessary for performing communication with a wireless LAN access point using the first communication unit; transmitting, in response to the reception of the request, the requested information to the other communication apparatus using the second communication unit; and starting the first communication unit after the reception of the request.

According to another aspect of the present invention, there is provided a control method of a communication apparatus comprising a first communication unit configured to perform wireless LAN communication and a second communication unit configured to perform BLE communication, the method comprising: receiving an ADV_EXT_IND signal from another communication apparatus using the second communication unit; transmitting, if the ADV_EXT_IND signal is received, an AUX_SCAN_REQ signal to the other communication apparatus in a channel based on channel information included in the ADV_EXT_IND signal regardless of whether an AUX_ADV_IND signal has been received from the other communication apparatus; receiving an AUX_SCAN_RSP signal from the other communication apparatus; and providing, using the first communication unit, the other communication apparatus with a communication parameter necessary for performing communication with a wireless LAN access point.

According to another aspect of the present invention, there is provided a non-transitory computer-readable storage medium for causing a computer to program for causing a computer to execute a control method of a communication apparatus comprising a first communication unit configured to perform wireless LAN communication and a second communication unit configured to perform another communication different from the wireless LAN communication, the method comprising: receiving, from another communication apparatus using the second communication unit, a request of information used when the other communication apparatus provides, by wireless LAN communication, the communication apparatus with a communication parameter necessary for performing communication with a wireless LAN access point using the first communication unit; transmitting, in response to the reception of the request, the requested information to the other communication apparatus using the second communication unit; and starting the first communication unit after the reception of the request.

According to another aspect of the present invention, there is provided a non-transitory computer-readable storage medium for causing a computer to program for causing a computer to execute a control method of a communication apparatus comprising a first communication unit configured to perform wireless LAN communication and a second communication unit configured to perform BLE communication, the method comprising: receiving an ADV_EXT_IND signal from another communication apparatus using the second communication unit; transmitting, if the ADV_EXT_IND signal is received, an AUX_SCAN_REQ signal to the other communication apparatus in a channel based on channel information included in the ADV_EXT_IND signal regardless of whether an AUX_ADV_IND signal has been received from the other communication apparatus; receiving an AUX_SCAN_RSP signal from the other communication apparatus; and providing, using the first communication unit, the other communication apparatus with a communication parameter necessary for performing communication with a wireless LAN access point.

Further features of the present invention will become apparent from the following description of exemplary embodiments with reference to the attached drawings.

DESCRIPTION OF THE EMBODIMENTS

Figure 1:
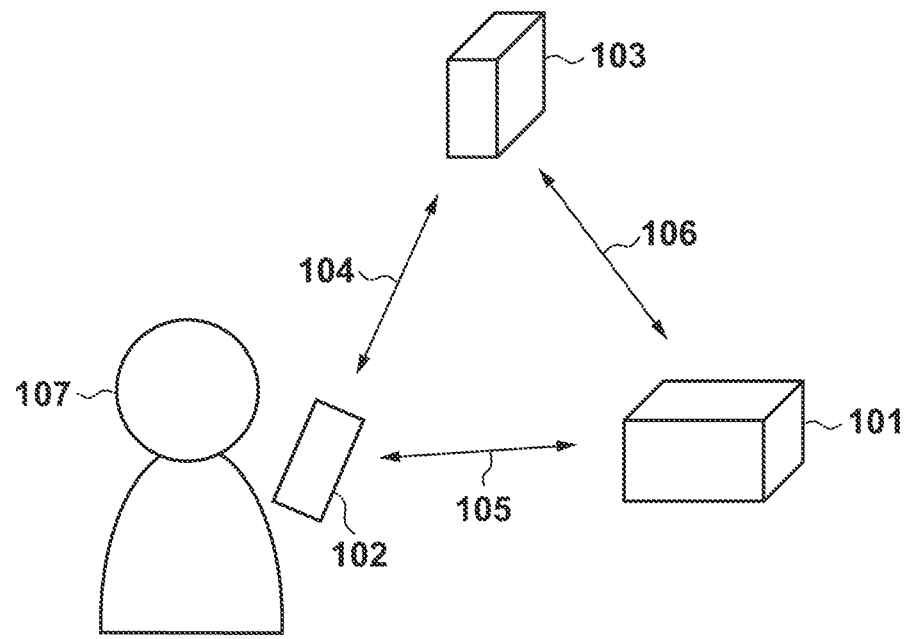
FIG. 1 is a view showing the outline of an example of the configuration of a communication system according to the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

A communication system of the first embodiment establishes, via a configurator device by a protocol corresponding to the DPP (Device Provisioning Protocol) using the BLE standard, communication according to the WLAN standard between an enrollee device and an access point. In this embodiment, an example of the system that uses a wireless LAN complying with the IEEE802.11 series standard as the WLAN standard will be described. IEEE is the abbreviation of "The Institute of Electrical and Electronics Engineers, Inc.".

FIG. 1 is a view showing the outline of the configuration of the communication system in the first embodiment. In order to establish communication according to a Wi-Fi standard between an enrollee device 101 and an access point 103, the DPP using the BLE standard is used via a configurator device 102 of a user 107. Note that it is premised that the configurator device 102 has established Wi-Fi communication 104 with the access point 103 in the past and already has setting information necessary for communication with the access point 103. The enrollee device 101 is a communication apparatus that establishes, via the configurator device 102 by the DPP, communication according to the WLAN standard with the access point 103. Examples of the communication apparatus that can operate as the enrollee device 101 include a printer, a digital camera, a digital home appliance, and the like. The configurator device 102 is a communication apparatus that enables the enrollee device to establish, by the DPP, communication according to the WLAN standard with the access point. Examples of the communication apparatus that can operate as the configurator device 102 include a mobile terminal such as a smartphone.

When the user 107 operates the application of the configurator device 102 to instruct the start of DPP processing, the DPP processing starts. The configurator device 102 performs communication 105 with the enrollee device 101 using the BLE standard, and obtains authentication information necessary for executing the DPP processing according to the Wi-Fi standard. That is, the authentication information is information used when the configurator device 102 provides, by WLAN communication, the enrollee device 101 with communication parameters necessary for the enrollee device 101 to communicate with the WLAN access point 103 according to the Wi-Fi standard. Thereafter, the DPP processing according to the Wi-Fi standard is executed between the configurator device 102 and the enrollee device 101. Through the DPP processing, the enrollee device 101 obtains, from the configurator device 102, setting information necessary for establishing communication according to the Wi-Fi standard with the access point 103. Based on the setting information, the enrollee device 101 executes connection processing with the access point 103 and establishes communication 106 according to the Wi-Fi standard.

Figure 2:
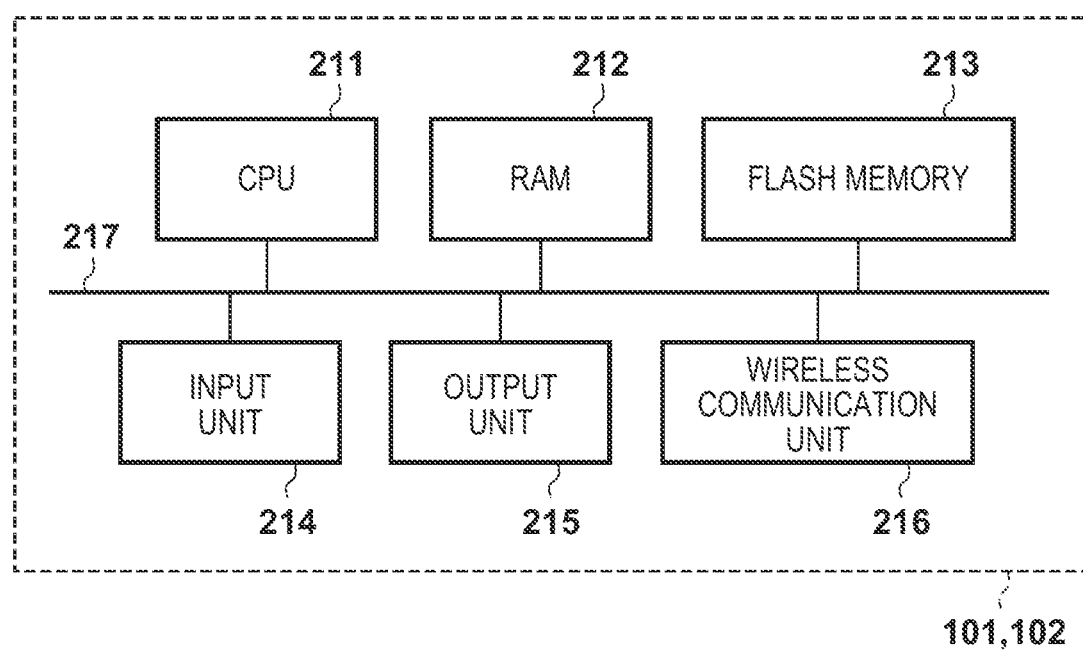
FIG. 2 is a block diagram showing an example of the hardware arrangement of a communication apparatus according to the first embodiment.

FIG. 2 is a block diagram showing an example of the hardware arrangement of the communication apparatus constituting the communication system in the first embodiment. The arrangement of the communication apparatus as the enrollee device 101 and the arrangement of the communication apparatus as the configurator device 102 can be shown in similar block diagrams. Therefore, in the following description, the arrangements of the enrollee device 101 and the configurator device 102 will be described with reference to the arrangement of the communication apparatus shown in FIGS. 2 and 3.

The communication apparatus includes a CPU (Central Processing Unit) 211, a RAM (Random Access Memory) 212, a flash memory 213, an input unit 214, an output unit 215, a wireless communication unit 216, and an internal bus 217.

The CPU 211 controls the entire communication apparatus by executing programs stored in the RAM 212 or flash memory 213 to be described later. Note that the CPU 211 may control the entire communication apparatus in cooperation with the programs stored in the RAM 212 or flash memory 213 and an OS (Operating System). Further, instead of or in addition to the CPU 211, a processor such as an MPU may control the entire communication apparatus, or a plurality of processors such as in a multicore processor may control the entire communication apparatus (configurator device 102 or enrollee device 101). Note that MPU is the abbreviation of "Micro Processing Unit".

The RAM 212 is a volatile memory used as a work area or the like when the CPU 211 executes various types of programs. Further, programs (computer programs) for executing various types of operations and various types of information such as communication parameters may be stored in the RAM 212. The flash memory 213 is a nonvolatile memory that stores programs (computer programs) for the communication apparatus to execute various types of operations and various types of information such as communication parameters.

Note that instead of or in addition to the RAM 212 and/or the flash memory 213, a storage medium such as a memory including a ROM (Read Only Memory) or the like, a flexible disk, a hard disk, an optical disk, a magneto-optical disk, a CD-ROM, a CD-R, a magnetic tape, a nonvolatile memory card, or a DVD may be used. A plurality of storage media may be used.

The input unit 214 accepts various types of operations from the user 107. The output unit 215 executes various types of outputs with respect to the user via a monitor screen or a speaker. Here, the output by the output unit 215 may be a sound output by the speaker, a vibration output, or the like in addition to the display on the screen. Note that both the input unit 214 and the output unit 215 may be implemented in one module. In this embodiment, the input unit 214 and the output unit 215 are formed by, for example, a touch panel and a display.

As will be described later with reference to FIG. 3, the wireless communication unit 216 includes a communication unit that performs communication according to the WLAN standard and a communication unit that performs another communication (communication according to the BLE standard in this embodiment) different from the communication according to the WLAN standard. That is, the wireless communication unit 216 is an interface for executing wireless communication complying with the BLE standard and wireless communication complying with the WLAN standard. Note that in this embodiment, for example, wireless communication complying with an IEEE802.11 series standard (Wi-Fi) is used as wireless communication complying with the WLAN standard. The wireless communication unit 216 controls, for example, wireless communication with the access point 103 and wireless communication with another communication apparatus using WLAN communication or BLE communication. The internal bus 217 connects the CPU 211 and the above-described respective units, and transmits data, a control signal, or the like.

Figure 3:
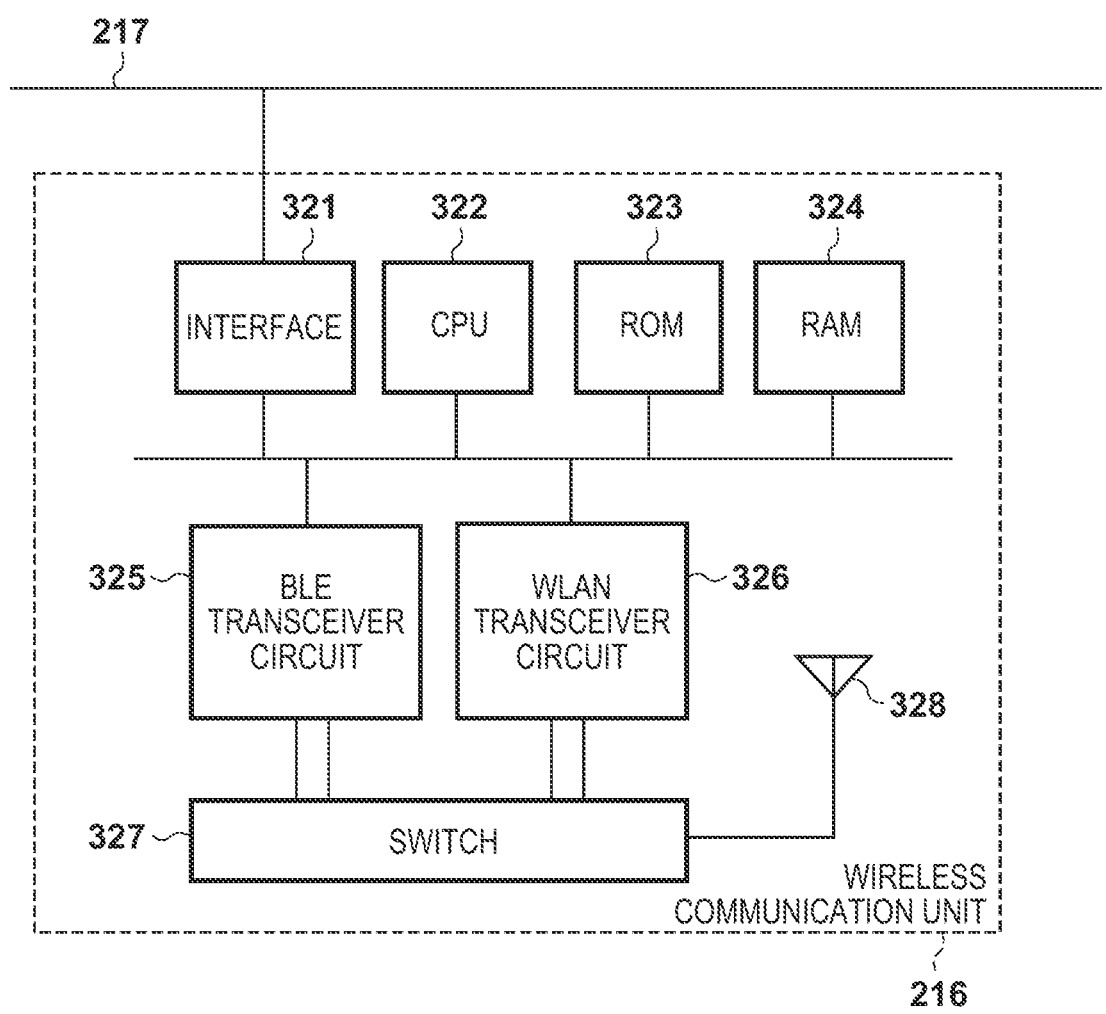
FIG. 3 is a block diagram showing an example of the hardware arrangement of a wireless communication unit according to the first embodiment.

FIG. 3 is a block diagram showing an example of the hardware arrangement of the wireless communication unit 216 in the communication apparatus. The wireless communication unit 216 includes an interface 321, a CPU 322, a ROM 323, a RAM 324, a BLE transceiver circuit 325, a WLAN transceiver circuit 326, a switch 327, and an antenna 328.

The interface 321 is connected to the internal bus 217 of the communication apparatus shown in FIG. 2. The wireless communication unit 216 inputs/outputs data, a control signal, or the like from/to each unit of the communication apparatus via the interface 321. The CPU 322 controls the overall operation of the wireless communication unit 216 based on a control signal from the CPU 211 of the communication apparatus. The CPU 322 controls the wireless communication unit 216 by executing programs stored in the ROM 323 to be described later to control data transmission/reception and the like. The ROM 323 stores various types of programs (computer programs) for the CPU 322 to execute various types of operations and various types of information such as communication parameters. The RAM 324 is a volatile memory used as a work area or the like when the CPU 322 executes various types of programs.

The BLE transceiver circuit 325 demodulates a BLE high-frequency signal received via the antenna 328, decreases its frequency, and converts it into data. Further, the BLE transceiver circuit 325 modulates and amplifies data input via the interface 321, converts it into a BLE high-frequency signal, and transmits it via the antenna 328. The WLAN transceiver circuit 326 demodulates a WLAN high-frequency signal received via the antenna 328, decreases its frequency, and converts it into data. Further, the WLAN transceiver circuit 326 modulates and amplifies data input via the interface 321, converts it into a WLAN high-frequency signal, and transmits it via the antenna 328. The switch 327 switches the circuit connected to the antenna 328. More specifically, the switch 327 connects the BLE transceiver circuit 325 and the antenna 328 when transmitting/receiving a BLE high-frequency signal, and connects the WLAN transceiver circuit 326 and the antenna 328 when transmitting/receiving a WLAN high-frequency signal.

In the communication system including the enrollee device 101 and configurator device 102 as communication apparatuses each having the above-described arrangement, processing for connecting the enrollee device 101 to the access point 103 using the DPP will be described. Note that when it is necessary to distinguish the arrangement of the communication apparatus described above as the enrollee device 101 or the configurator device 102, E or C is added to the end of the reference numeral. For example, the wireless communication unit of the enrollee device 101 is described as the wireless communication unit 216E, and the wireless communication unit of the configurator device 102 as the configurator device is described as the wireless communication unit 216C.

Figure 4:
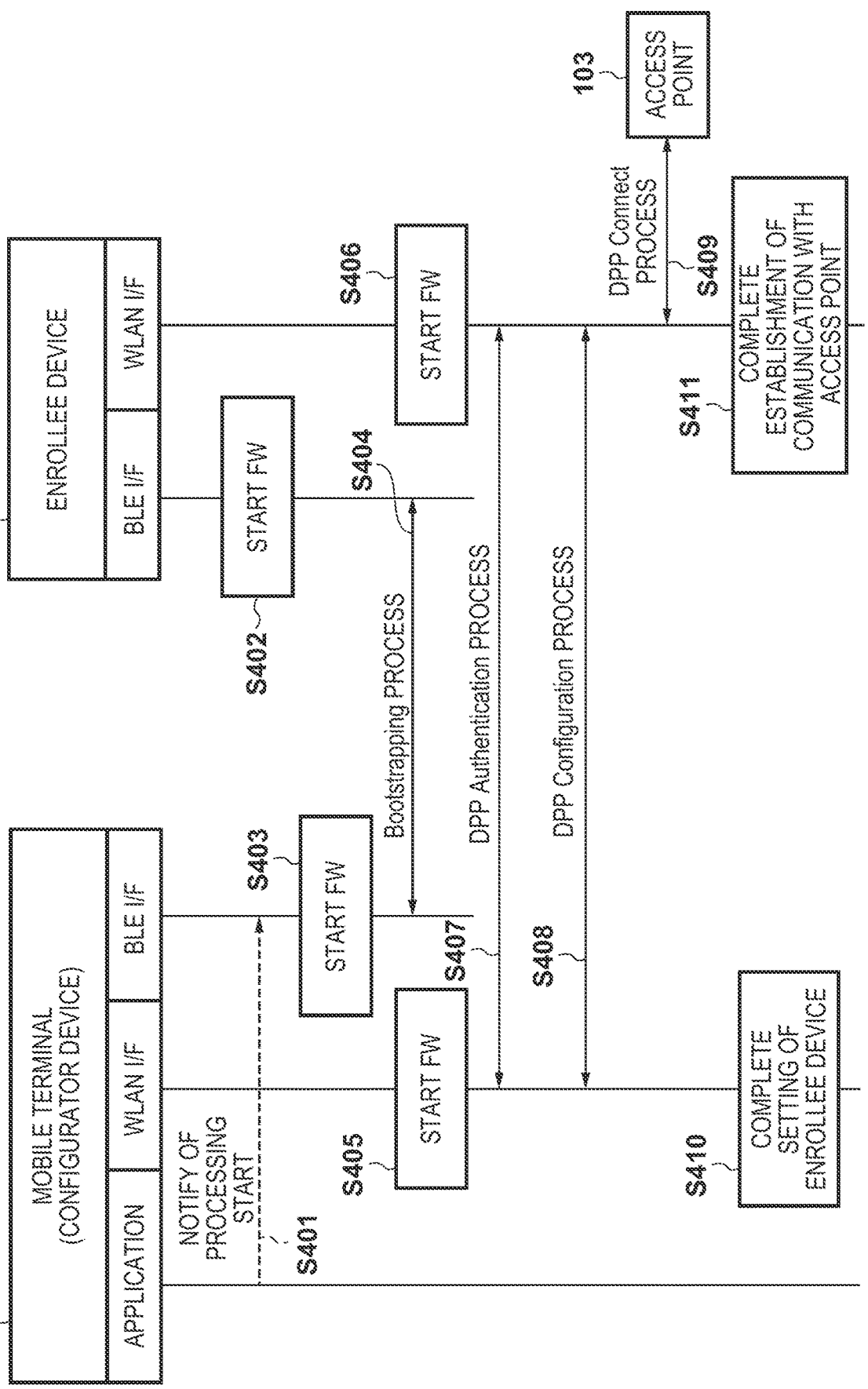
FIG. 4 is a sequence chart showing processing of establishing wireless communication between an enrollee device and an access point according to the first embodiment.
Figure 5:
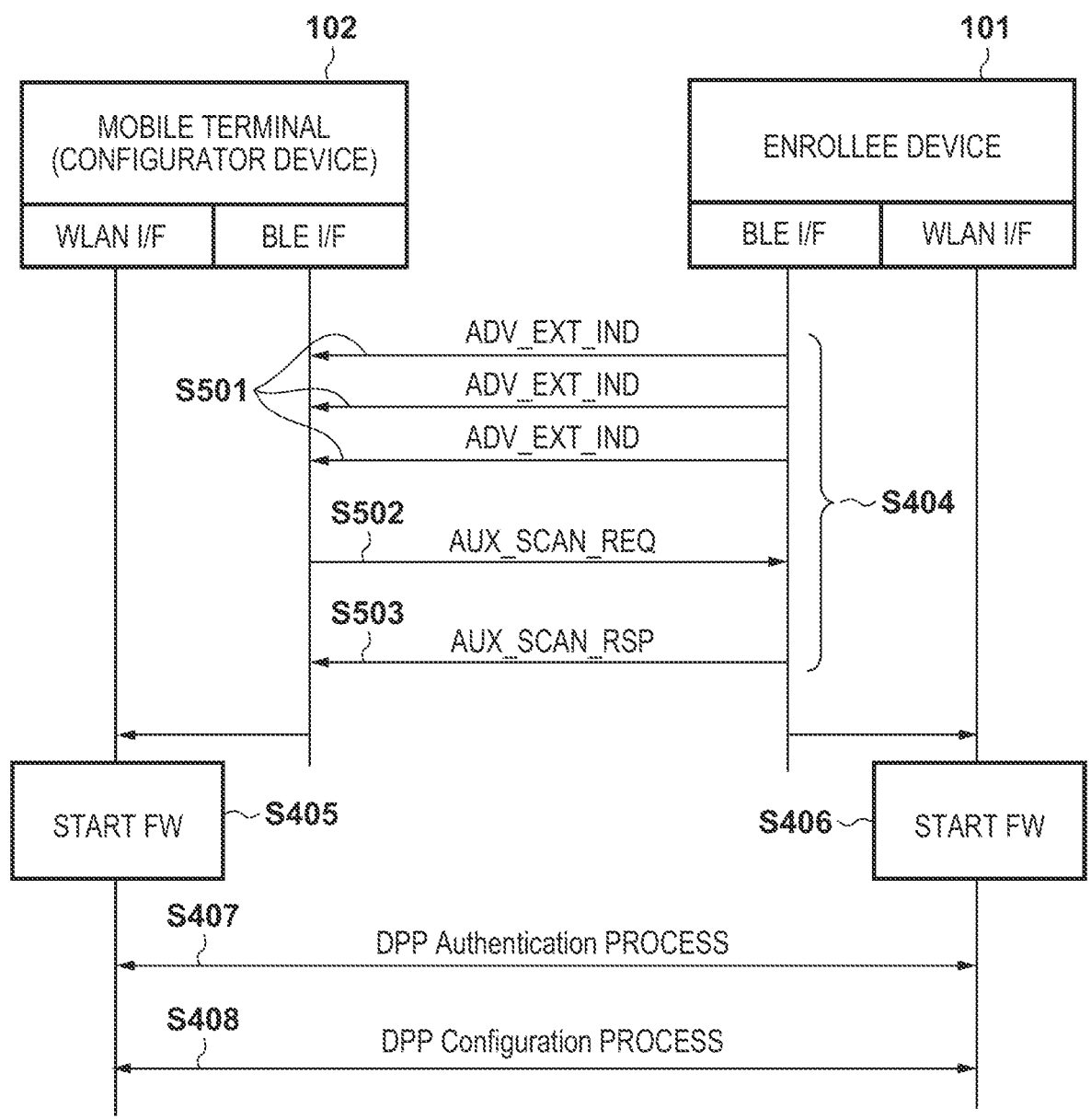
FIG. 5 is a sequence chart showing the details of a Bootstrapping process according to the first embodiment.
Figure 6:
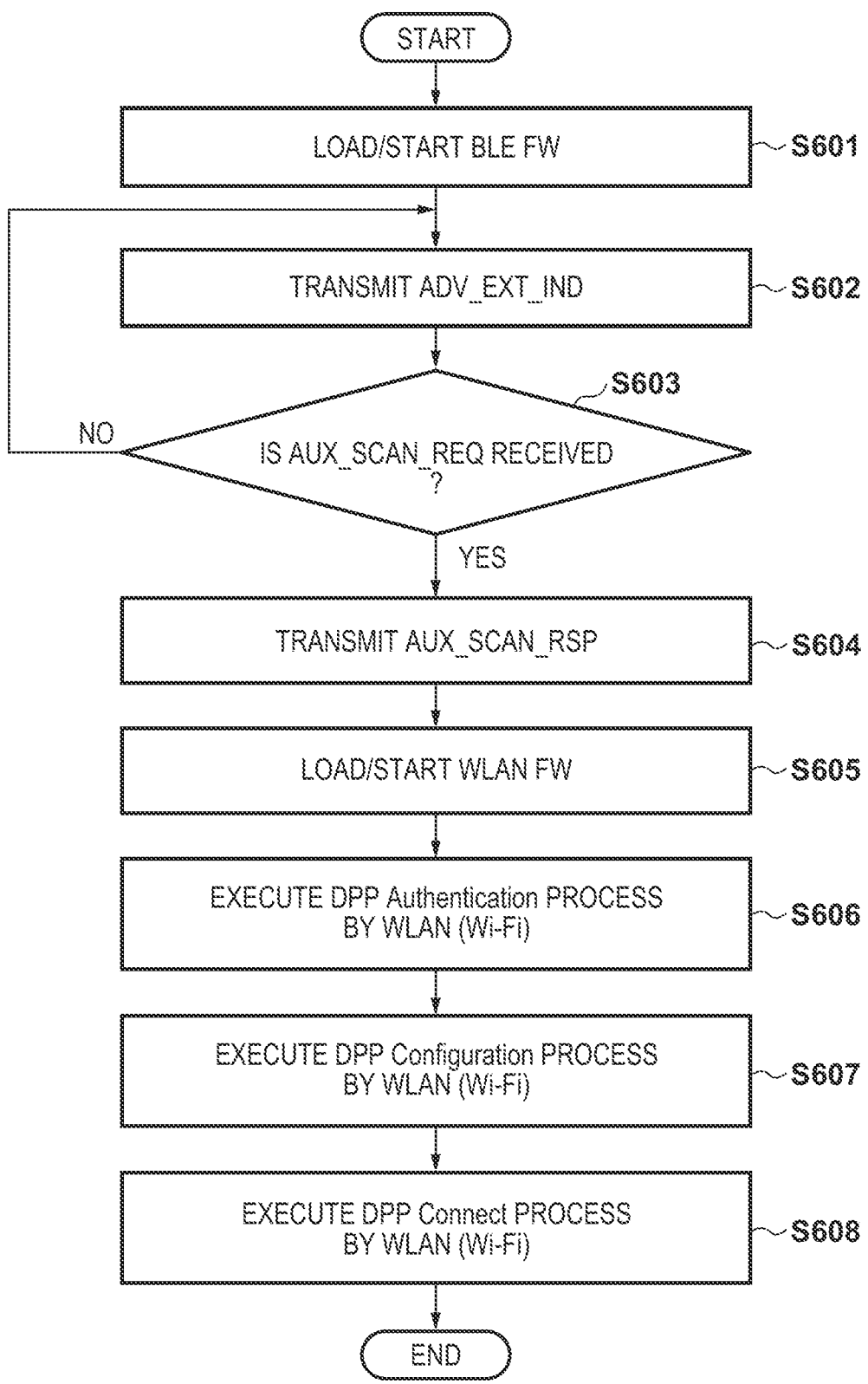
FIG. 6 is a flowchart illustrating connection processing to a wireless LAN executed in the enrollee device according to the first embodiment.
Figure 7:
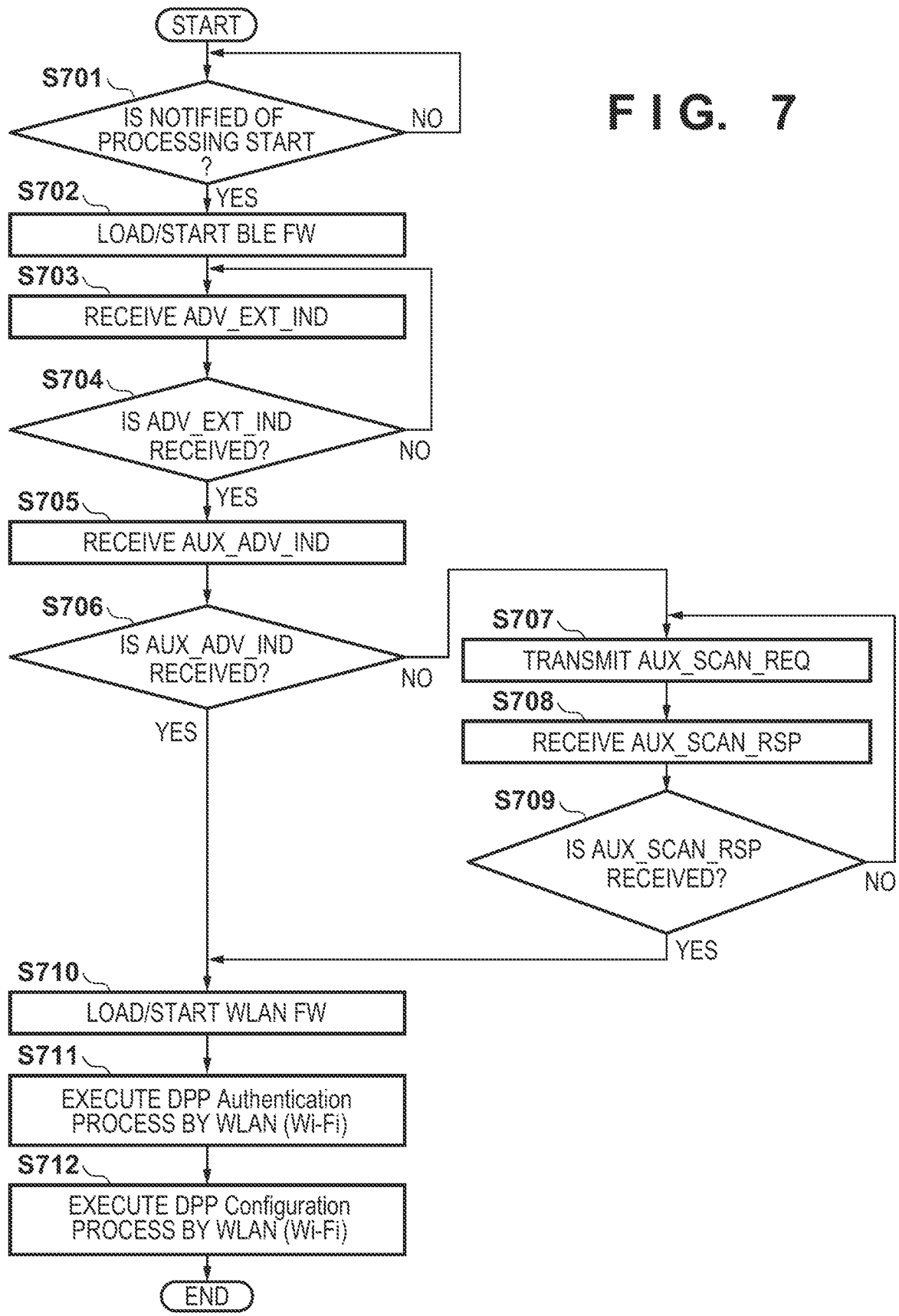
FIG. 7 is a flowchart illustrating DPP processing in a mobile terminal according to the first embodiment.

Next, the processing procedure for establishing, via the configurator device 102, communication according to the WLAN standard between the enrollee device 101 and the access point 103 in the communication system of this embodiment will be described with reference to the attached sequence charts and flowcharts. Each of FIGS. 4 and 5 is a sequence chart showing the processing for establishing, via the configurator device 102 using a protocol corresponding to the DPP standard, communication according to the WLAN standard between the enrollee device 101 and the access point 103. FIG. 4 shows the overall processing procedure, and FIG. 5 shows the detailed procedure of a Bootstrapping process. Further, FIG. 6 is a flowchart of processing in the enrollee device 101 and FIG. 7 is a flowchart of processing in the configurator device 102, both of which correspond to the sequence chart in FIG. 5.

First, the overall processing procedure will be described with reference to FIG. 4. As described above, it is premised that the configurator device 102 has established WLAN communication with the access point 103 in the past and already has setting information necessary for communication with the access point 103. The configurator device 102 sets, in the enrollee device 101 by the DPP, the setting information for the enrollee device 101 to connect to the access point 103.

Figure 8:
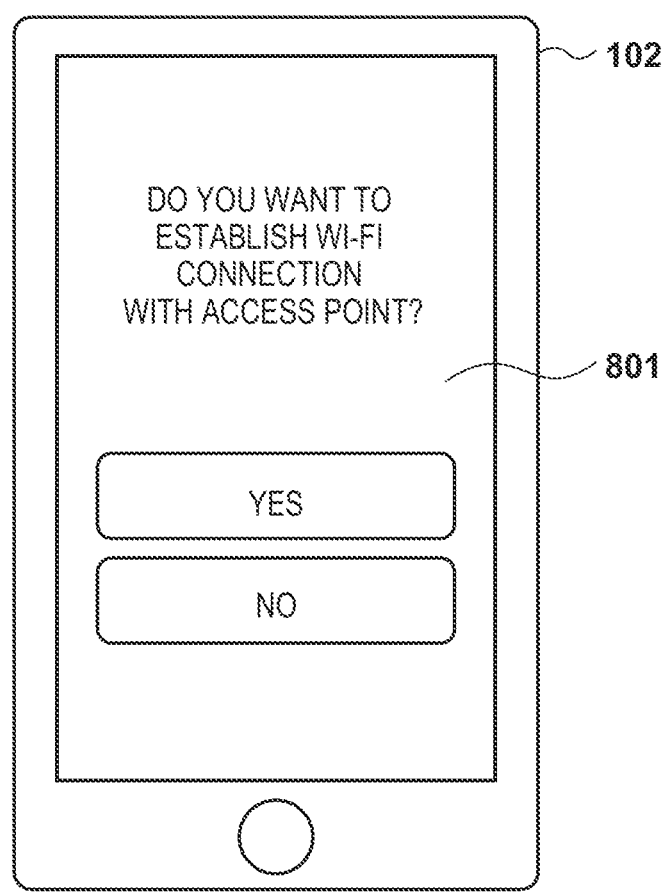
FIG. 8 is a view showing an example of an application UI displayed on the output unit of the mobile terminal.

The user 107 operates the user interface (UI) of the application displayed on the output unit 215 of the configurator device 102 to start DPP processing. An example of the UI in this case is shown in FIG. 8. When the "YES" button is selected in a UI 801 shown in FIG. 8, the CPU 211C notifies the wireless communication unit 216C (BLE transceiver circuit 325C) of a connection processing start instruction (step S401). The wireless communication unit 216C that has received the start instruction starts DPP processing.

The wireless communication unit 216C that has started the DPP processing starts firmware (FW) for BLE communication (step S403). On the other hand, the enrollee device 101 starts firmware (FW) for BLE communication, for example, when the enrollee device 101 is powered on (step S402). The enrollee device 101 and the configurator device 102 communicate with each other using the BLE standard, execute a Bootstrapping process, and obtain authentication information necessary for executing the DPP processing according to the WLAN standard (step S404). Note that in this embodiment, the operation from step S402 is started when the enrollee device 101 is powered on, but the present invention is not limited to this. For example, the operation from step S402 may be started in response that acquisition of communication parameters is instructed from the application UI in the enrollee device 101.

Then, each of the wireless communication unit 216C of the configurator device 102 and the wireless communication unit 216E of the enrollee device starts firmware (FW) necessary for WLAN communication (steps S405 and S406). Then, the configurator device 102 and the enrollee device 101 execute a DPP Authentication process (step S407) and a DPP Configuration process (step S408) by communication using WLAN. Thus, the enrollee device 101 obtains the setting information necessary for establishing communication according to the WLAN standard with the access point 103 from the configurator device 102. The enrollee device 101 executes a DPP Connect process with the access point 103 based on the setting information (step S409), and completes the establishment of communication with the access point 103. The configurator device 102 completes the setting of the enrollee device 101 (registration of information for connecting to the access point 103 in the enrollee device 101) (step S410).

Next, the details from the Bootstrapping process (step S404) to the DPP Configuration process (step S408) will be described with reference to the sequence chart in FIG. 5.

First, the enrollee device 101 repeatedly transmits an ADV_EXT_IND signal (ADV_EXT_IND packet) serving as an advertisement signal (advertisement packet) (step S501). The ADV_EXT_IND signal includes channel information for executing transfer processing of the authentication information of the enrollee device 101 necessary for executing DPP processing according to the WLAN standard. The configurator device 102 transmits an AUX_SCAN_REQ signal to the enrollee device 101 in the channel included in the ADV_EXT_IND signal (step S502). The AUX_SCAN_REQ signal is a signal for requesting the authentication information of the enrollee device 101. Note that the DPP standard defines that after transmitting an ADV_EXT_IND signal, the enrollee device 101 transmits an AUX_ADV_IND signal including the authentication information of the enrollee device 101. On the other hand, the enrollee device 101 of this embodiment transmits no AUX_ADV_IND signal. Therefore, an exchange of an AUX_SCAN_REQ signal and an AUX_SCAN_RSP signal occurs between the enrollee device 101 and the configurator device 102.

The enrollee device 101 that has received the AUX_SCAN_REQ signal in the channel described above transmits an AUX_SCAN_RSP signal including the authentication information of the enrollee device 101 to the configurator device 102 (step S503). That is, in response to a request (AUX_SCAN_REQ signal) from the configurator device 102, the enrollee device 101 provides the configurator device 102 with information (AUX_SCAN_RSP signal) for communication according to the WLAN standard. Then, after transmitting the AUX_SCAN_RSP signal, the enrollee device 101 starts firmware for WLAN communication (step S406). That is, the enrollee device 101 of this embodiment starts the firmware for WLAN communication after providing the configurator device 102 with the authentication information as information for communicating with the configurator device 102 according to the WLAN standard (step S503). In addition, the configurator device 102 starts firmware for WLAN communication after receiving the AUX_SCAN_RSP signal (step S405). Thereafter, as described with reference to FIG. 4, the configurator device 102 and the enrollee device 101 start communication according to the WLAN standard, and execute a DPP Authentication process (step S407) and a DPP Configuration process (step S408).

FIG. 6 is a flowchart illustrating processing in the enrollee device 101. The processing described below is mainly executed by the CPU 211E of the enrollee device 101 and/or the CPU 322E of the wireless communication unit 216E, but in the following description, the enrollee device 101 will be described as the main constituent of the processing.

First, the enrollee device 101 loads/starts the firmware (FW) for BLE communication by the BLE transceiver circuit 325 (step S601). The enrollee device 101 repeatedly transmits an ADV_EXT_IND signal (step S602) and waits to receive an AUX_SCAN_REQ signal from the configurator device (step S603). When an AUX_SCAN_REQ signal is received, the enrollee device 101 transmits an AUX_SCAN_RSP signal to the configurator device (step S604), and loads/starts the firmware (FW) for WLAN communication by the WLAN transceiver circuit 326 (step S605).

Thereafter, the enrollee device 101 executes a DPP Authentication process (step S606) and a DPP Configuration process (step S607) using WLAN communication. Then, the enrollee device 101 executes a DPP Connect process using the setting information necessary for establishing communication according to the WLAN standard obtained in these processes, and establishes a connection with the access point 103 (step S608).

As described above, the enrollee device 101 starts the firmware for WLAN communication after transmitting the AUX_SCAN_RSP signal including the authentication information of the enrollee device 101 in response to the reception of the AUX_SCAN_REQ signal from the configurator device 102. In this manner, since the enrollee device 101 does not start the firmware for WLAN communication until immediately before WLAN communication with the configurator device 102 is required, the power consumption can be reduced.

FIG. 7 is a flowchart of processing in the configurator device 102. The processing described below is mainly executed by the CPU 211C of the configurator device 102 as the configurator device and/or the CPU 322C in the wireless communication unit 216C, but the configurator device 102 will be described as the main constituent of the processing.

When the start of connection processing is instructed by the application (step S701), the configurator device 102 loads/starts the firmware (FW) for BLE communication (step S702). Then, the configurator device 102 receives an ADV_EXT_IND signal transmitted from the enrollee device 101 via BLE communication (step S703). When an ADV_EXT_IND signal is received (YES in step S704), the configurator device 102 receives an AUX_ADV_IND signal from the enrollee device 101 (step S705). The configurator device 102 determines whether an AUX_ADV_IND signal has been received from the enrollee device 101 (step S706). If it is determined that no AUX_ADV_IND signal could be received, the configurator device 102 transmits an AUX_SCAN_REQ signal to the enrollee device 101 (step S707), and waits to receive an AUX_SCAN_RSP signal (steps S708 and S709).

If an AUX_SCAN_RSP signal is received, the configurator device 102 loads/starts the firmware for WLAN communication (step S710). Thereafter, the configurator device 102 executes a DPP Authentication process (step S711) and a DPP Configuration process (step S712) using WLAN communication. With these processes, the configurator device 102 sets, in the enrollee device 101, the setting information necessary for establishing communication according to the WLAN standard with the access point 103 and enables the enrollee device 101 to establish a connection with the access point 103.

The processing on the configurator device 102 side described above is similar to that defined in the DPP standard. However, the DPP standard does not define the timing of loading/starting the firmware for WLAN communication. Note that in the first embodiment, since the enrollee device 101 transmits no AUX_ADV_IND signal, it is always determined NO in step S704, so that the processing from S707 to S709 is executed. Thus, according to the first embodiment, the operation in which the configurator device requests information for WLAN communication from the enrollee device and the enrollee device provides the information in response to the request is always executed. As a result, the firmware can be started at a timing when WLAN communication is required, so that the operation time of the firmware can be shortened.

Second Embodiment

In the first embodiment, since the enrollee device transmits no AUX_ADV_IND signal, provision of information by an AUX_SCAN_REQ signal and an AUX_SCAN_RSP signal is always executed. In the second embodiment, the configurator device transmits an AUX_SCAN_REQ signal regardless of whether an AUX_ADV_IND signal is received, and is provided with information by an AUX_SCAN_RSP signal.

As in the first embodiment, a system according to the second embodiment establishes, via a configurator device by the DPP using the BLE standard, communication according to the WLAN standard between an enrollee device and an access point. An example in which a mobile terminal is used as the configurator device and a wireless LAN (Wi-Fi) system complying with the IEEE802.11 series as the WLAN standard is used will be described. Note that the configuration of the communication system, the hardware arrangement of a configurator device 102, and the hardware arrangement of an enrollee device 101 are similar to those in the first embodiment. In addition, as in the first embodiment, it is premised that the configurator device 102 has established WLAN communication with an access point 103 in the past and already has setting information necessary for communication with the access point.

Next, the processing procedure for establishing, via the mobile terminal, communication according to the WLAN standard between the enrollee device and the access point in the communication system of the second embodiment will be described with reference to a sequence chart and a flowchart. Note that the overall processing procedure for establishing, via the configurator device 102, communication according to the WLAN standard between the enrollee device 101 and the access point 103 is similar to that (FIG. 4) in the first embodiment, so that the description thereof is omitted.

Figure 9:
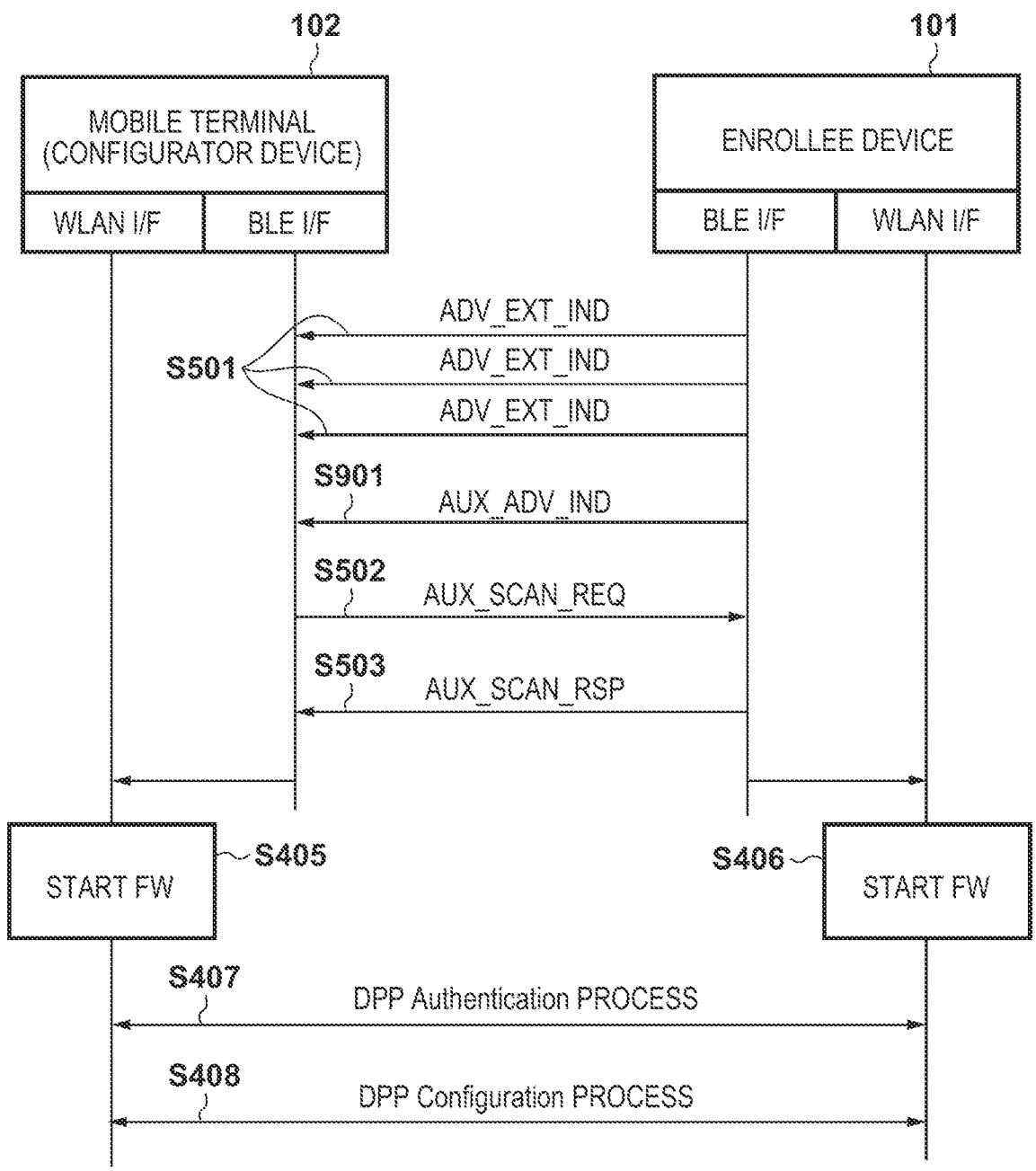
FIG. 9 is a sequence chart showing the details of a Bootstrapping process according to the second embodiment.
Figure 10:
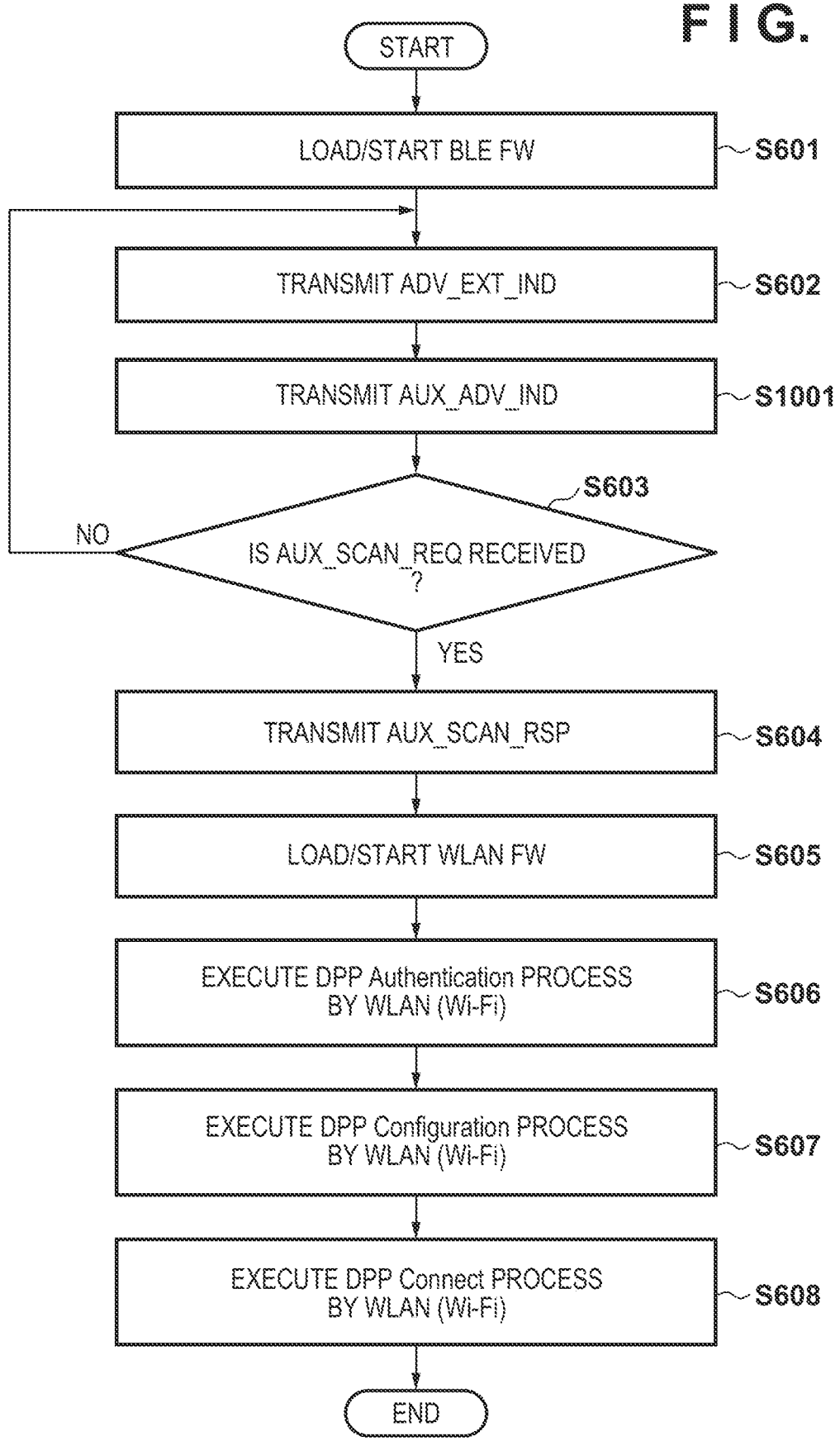
FIG. 10 is a flowchart illustrating processing in an enrollee device according to the second embodiment.
Figure 11:
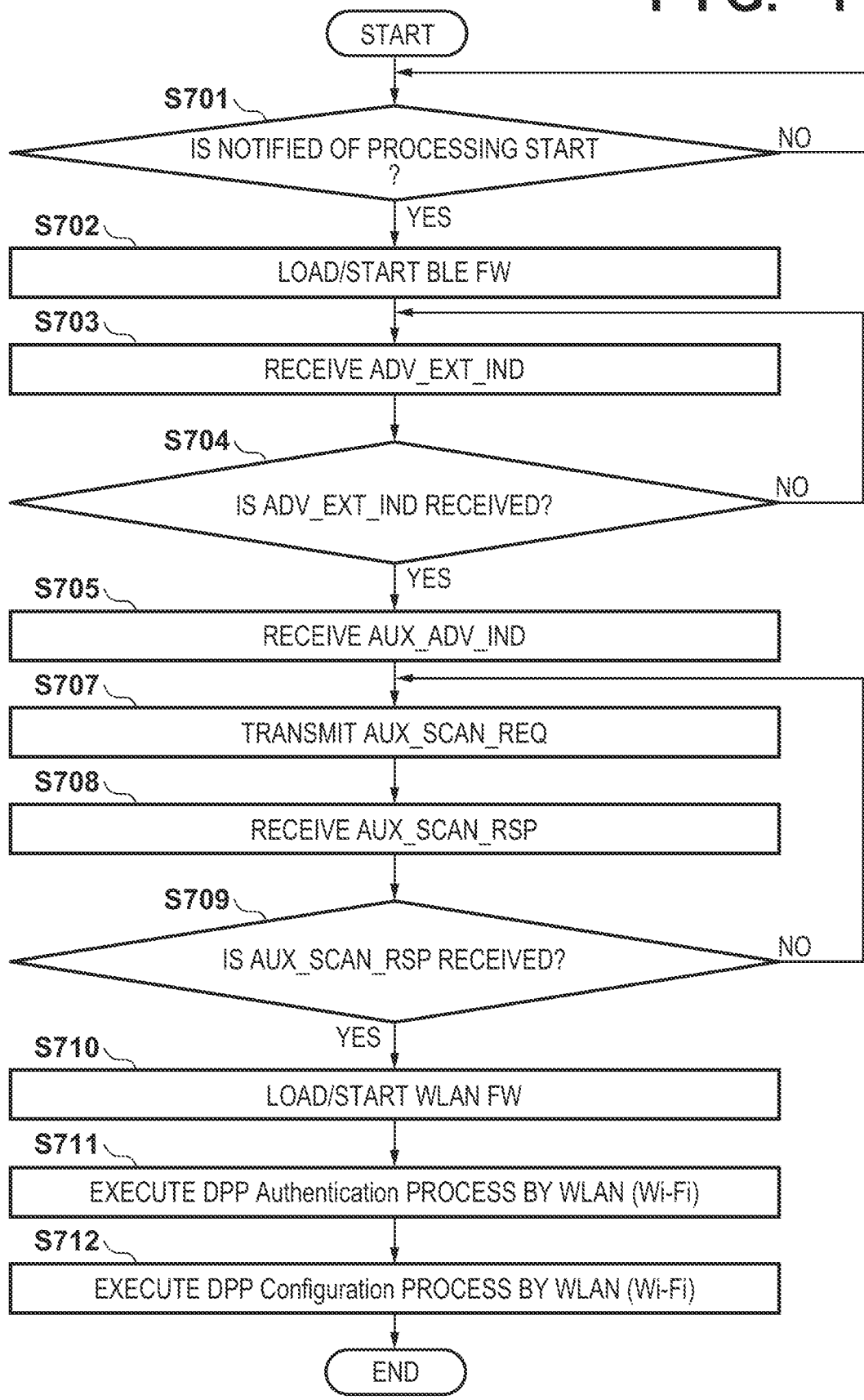
FIG. 11 is a flowchart illustrating processing in a mobile terminal according to the second embodiment.

FIG. 9 is a sequence chart showing the details of processing from a Bootstrapping process (step S404) to a DPP Configuration process (step S408) using the protocol corresponding to the DPP standard according to the second embodiment. The step similar to that (FIG. 5) in the first embodiment is denoted by the same step number as in the first embodiment. Further, FIG. 10 is a flowchart of processing in the enrollee device 101 and FIG. 11 is a flowchart of processing in the configurator device 102, both of which correspond to the sequence chart in FIG. 9.

The enrollee device 101 transmits an ADV_EXT_IND signal serving as an advertisement signal (step S501). This signal includes channel information for executing transfer processing of the authentication information of the enrollee device necessary for executing DPP processing according to the WLAN standard. Subsequently, the enrollee device 101 transmits an AUX_ADV_IND signal to the configurator device 102 in the channel included in the ADV_EXT_IND signal (step S901). The configurator device 102 transmits an AUX_SCAN_REQ signal to the enrollee device 101 in the channel included in the ADV_EXT_IND signal (step S502). This signal is a signal for requesting the authentication information of the enrollee device 101.

Note that the DPP standard defines that the configurator device 102 transmits an AUX_SCAN_REQ signal to the enrollee device 101 if it has received no AUX_ADV_IND signal from the enrollee device 101. However, the configurator device 102 of the second embodiment transmits an AUX_SCAN_REQ signal to the enrollee device 101 regardless of whether an AUX_ADV_IND signal is received in step S901 (step S502). That is, the configurator device 102 of the second embodiment always requests, using communication according to the BLE standard, the enrollee device 101 to transmit information for performing communication according to the WLAN standard with the enrollee device 101. Note that the AUX_SCAN_REQ signal is transmitted in the channel included in the ADV_EXT_IND signal.

The enrollee device 101 that has received the AUX_SCAN_REQ signal transmits an AUX_SCAN_RSP signal including the authentication information of the enrollee device 101 to the configurator device 102 (step S503). After this transmission, the enrollee device 101 starts firmware for WLAN communication (step S406). In addition, the configurator device 102 starts firmware necessary for WLAN communication after receiving the AUX_A-CAN_RSP signal (step S405). Thereafter, as in the first embodiment, a DPP Authentication process (step S407) and a DPP Configuration process (step S408) by WLAN communication are executed between the configurator device 102 and the enrollee device 101.

FIG. 10 is a flowchart of processing on the enrollee device 101 side. In FIG. 10, the step similar to that (FIG. 6) in the first embodiment is denoted by the same step number as in the first embodiment. The enrollee device 101 repeats transmission of an ADV_EXT_IND signal (step S602) and transmission of an AUX_ADV_IND signal (step S1001) until the reception of an AUX_SCAN_REQ signal is confirmed in step S603. As in the first embodiment, in response to the reception of an AUX_SCAN_REQ signal transmitted from the configurator device 102, the enrollee device 101 transmits an AUX_SCAN_RSP signal including the authentication information of the enrollee device 101 to the configurator device 102 (step S604). After transmitting the AUX_SCAN_RSP signal, the enrollee device 101 starts firmware for WLAN communication (step S605).

In this manner, since the enrollee device 101 does not start the firmware for WLAN communication until immediately before WLAN communication with the configurator device 102 is required, the power consumption can be reduced.

FIG. 11 is a flowchart of processing in the configurator device 102 according to the second embodiment. The step similar to that (FIG. 7) in the first embodiment is denoted by the same step number as in the first embodiment. In the processing shown in FIG. 11, the branching of the processing depending on whether an AUX_ADV_IND signal is received executed in the first embodiment is omitted. That is, after receiving an ADV_EXT_IND signal from the enrollee device 101, the configurator device 102 transmits an AUX_SCAN_REQ signal to the enrollee device 101 regardless of whether an AUX_ADV_IND signal is received (step S707). Thereafter, if an AUX_SCAN_RSP signal could not been received from the enrollee device 101, firmware for WLAN communication is started (steps S708 to S710).

Third Embodiment

As in the first embodiment, a system according to the third embodiment establishes, via a configurator device by the DPP using the BLE standard, communication according to the WLAN standard between an enrollee device and an access point. An example in which a mobile terminal is used as the configurator device and a wireless LAN (Wi-Fi) system complying with the IEEE802.11 series as the WLAN standard is used will be described. Note that the configuration of the communication system, the hardware arrangement of the mobile terminal, and the hardware arrangement of the enrollee device are similar to those (FIGS. 1 to 3) in the first and second embodiments. Also in the third embodiment, it is premised that a configurator device 102 has established WLAN communication with an access point 103 in the past and already has setting information necessary for communication with the access point.

Next, the processing procedure for establishing, via the mobile terminal, communication according to the WLAN standard between the enrollee device and the access point in the communication system of the third embodiment will be described with reference to a sequence chart and a flowchart shown in FIGS. 12 and 13, respectively. Note that the overall processing procedure for establishing, via the configurator device 102, communication according to the WLAN standard between the enrollee device 101 and the access point 103 is similar to that (FIG. 4) in the first and second embodiments, so that the illustration and description thereof are omitted.

Figure 12:
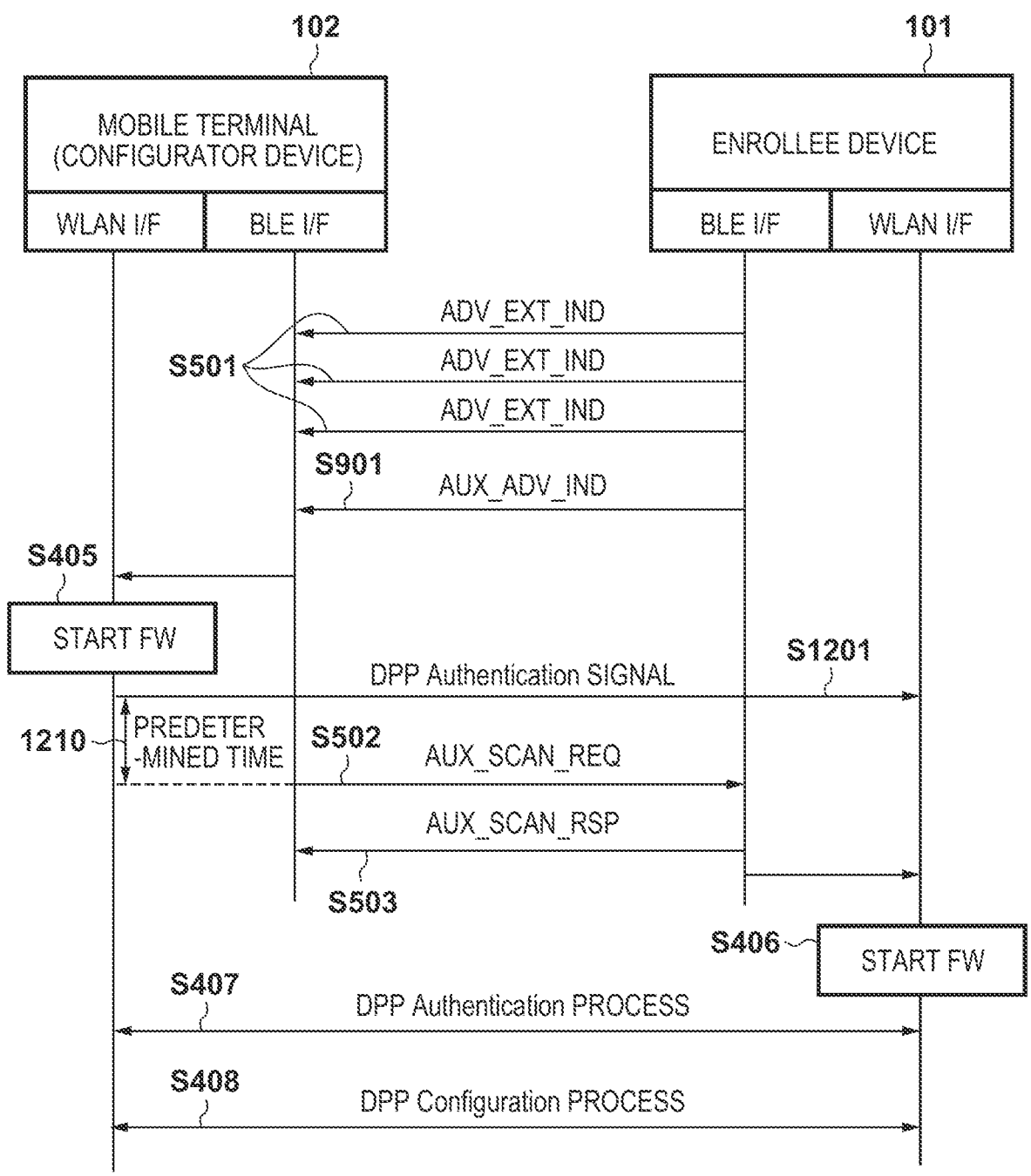
FIG. 12 is a sequence chart showing the details of a Bootstrapping process according to the third embodiment.

FIG. 12 is a sequence chart showing the detailed procedure from a Bootstrapping process to a DPP Configuration process in processing for establishing, via the configurator device 102 by a protocol corresponding to the DPP standard, communication according to the WLAN standard between the enrollee device 101 and the access point 103. FIG. 13 is a flowchart illustrating processing in the configurator device 102 corresponding to the sequence chart in FIG. 12. Note that processing in the enrollee device 101 is similar to that (FIG. 6) in the first embodiment or that (FIG. 10) in the second embodiment.

In FIG. 12, the enrollee device 101 transmits an ADV_EXT_IND signal serving as an advertisement signal (step S501). This signal includes channel information for executing transfer processing of the authentication information of the enrollee device necessary for executing DPP processing according to the WLAN standard. Subsequently, the enrollee device 101 transmits an AUX_ADV_IND signal to the configurator device 102 in the channel included in the ADV_EXT_IND signal (step S901).

The configurator device 102 starts firmware for WLAN communication after receiving the ADV_EXT_IND signal (step S405). Then, the configurator device 102 transmits a DPP Authentication signal to the enrollee device 101 by WLAN communication (step S1201). Thereafter, if there is no response by WLAN communication from the enrollee device 101 even after a predetermined time 1210 has elapsed, the configurator device 102 transmits an AUX_SCAN_REQ signal to the enrollee device 101 by BLE communication (step S502). As described above, the AUX_SCAN_REQ signal is transmitted in the channel included in the ADV_EXT_IND signal. The AUX_SCAN_REQ signal is a signal for requesting the authentication information of the enrollee device 101.

The enrollee device 101 that has received the AUX_SCAN_REQ signal transmits an AUX_SCAN_RSP signal including the authentication information of the enrollee device 101 to the configurator device 102 (step S503). After this transmission, the enrollee device 101 loads/starts firmware for WLAN communication (step S406). Thereafter, a DPP Authentication process (step S407) and a DPP Configuration process (step S408) by WLAN communication are executed between the configurator device 102 and the enrollee device 101. Note that if the enrollee device 101 responds to the DPP Authentication start request in step S1201 within the predetermined time 1210, a DPP Authentication process and a DPP Configuration process are executed.

The processing in the enrollee device 101 according to the third embodiment is similar to that (FIG. 10) in the second embodiment. As described in the second embodiment, after receiving an AUX_SCAN_REQ signal transmitted from the configurator device 102 (step S603), the enrollee device 101 transmits an AUX_SCAN_RSP signal to the configurator device 102 (step S604). After that, the enrollee device 101 loads/starts firmware for WLAN communication (step S605). In this manner, since the enrollee device 101 does not start the firmware for WLAN communication until immediately before the execution of WLAN communication with the configurator device 102, the power consumption can be reduced.

Figure 13:
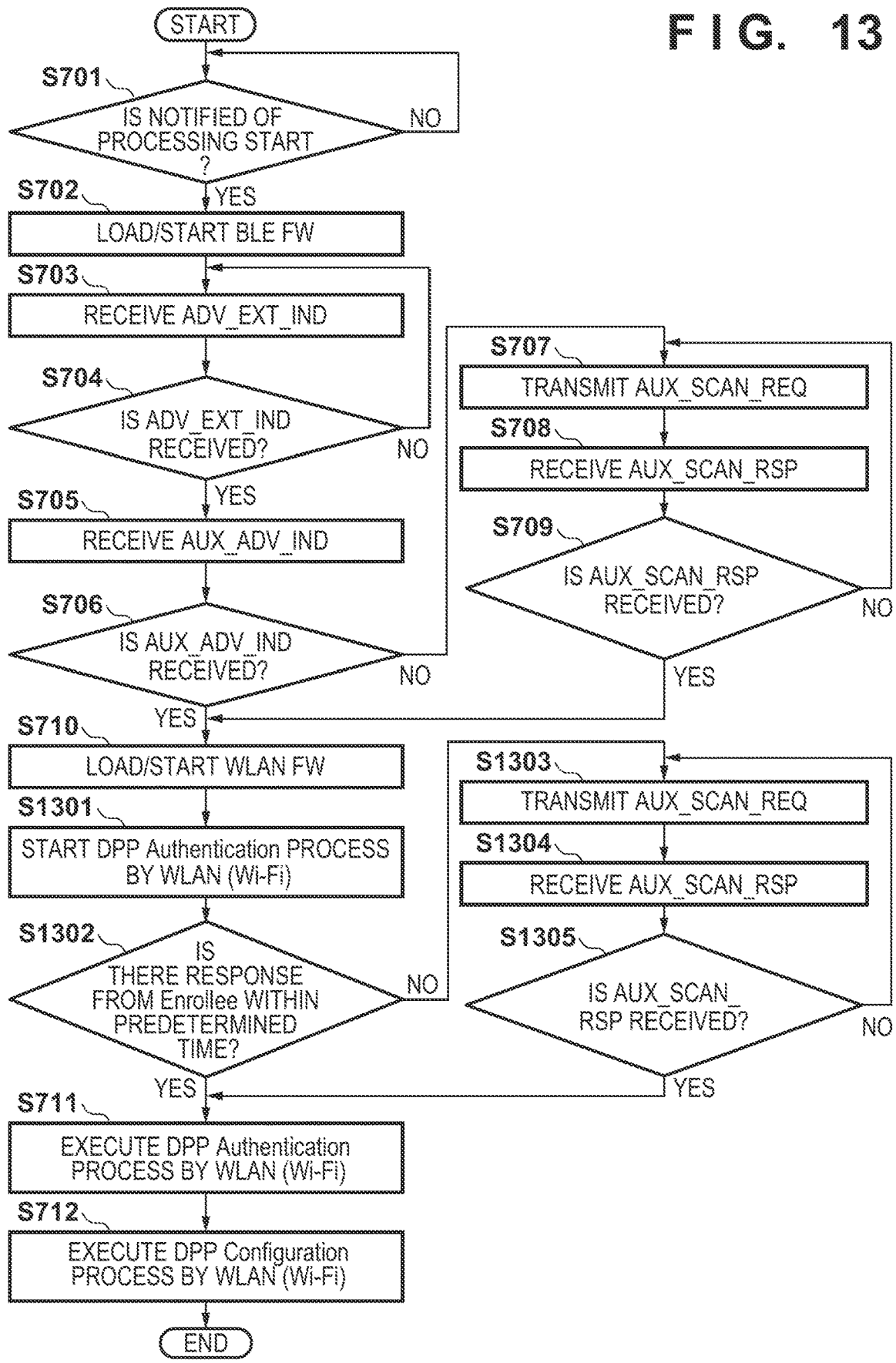
FIG. 13 is a flowchart illustrating processing in a mobile terminal according to the third embodiment.

FIG. 13 is a flowchart of processing in the configurator device 102 according to the third embodiment. Note that in FIG. 13, the step similar to that (FIG. 7) in the first embodiment is denoted by the same step number as in the first embodiment.

If the configurator device 102 could receive an AUX_ADV_IND signal transmitted from the enrollee device 101 (YES in step S706), the configurator device 102 starts firmware for WLAN communication (step S710). Then, the configurator device 102 starts a DPP Authentication process by WLAN communication (step S1301). However, since no AUX_SCAN_REQ has been transmitted from the configurator device 102 to the enrollee device 101, the enrollee device 101 has not yet started firmware for WLAN communication. Therefore, the configurator device 102 cannot obtain a response from the enrollee device 101 within a predetermined time (NO in step S1302). In this case, the configurator device 102 transmits an AUX_SCAN_REQ signal by BLE communication (step S1303). If an AUX_SCAN_RSP signal is received from the enrollee device 101 (step S1304 and YES in step S1305), the configurator device 102 starts again a DPP Authentication process by WLAN communication (step S711). Subsequently, the configurator device 102 executes a DPP Configuration process (step S712).

On the other hand, if the configurator device 102 could not receive the AUX_ADV_IND signal from the enrollee device 101 in step S706, steps S707 to S710 are executed as in the first and second embodiments, and firmware for WLAN communication is started. That is, the configurator device 102 transmits an AUX_SCAN_REQ signal to the enrollee device 101 (step S707). If an AUX_SCAN_RSP signal is received (step S708 and YES in step S709), the configurator device 102 starts firmware for WLAN communication (step S710). Thereafter, a DPP Authentication process by WLAN communication is started (step S711).

In this case, since the AUX_SCAN_REQ signal has already been transmitted to the enrollee device 101, firmware for WLAN communication has been started in the enrollee device 101. Accordingly, the configurator device 102 can obtain a response to the DPP Authentication signal from the enrollee device 101 within a predetermined time (YES in step S1302), and a DPP Authentication process with the enrollee device 101 is executed (step S711). Thereafter, the configurator device 102 executes a DPP Configuration process with the enrollee device 101 by WLAN communication (step S712).

As described above, according to the third embodiment, if the firmware for WLAN communication has already been started for some reason, it is possible to quickly execute processing after a DPP Authentication process using the information of the AUX_ADV_IND signal. As a result, it is possible to quickly execute DPP processing and reduce the extra operation time of the firmware in the enrollee device.

As described above, according to each of the embodiments described above, the operation in which the configurator device requests information for WLAN communication from the enrollee device and the enrollee device provides the information in response to the request is always executed. Then, after providing the information in response to the request, the enrollee device starts firmware for WLAN communication. As a result, it is possible to more reliably achieve the start of the firmware at the timing when WLAN communication is required, and shorten the operation time of the firmware.

That is, according to each of the embodiments described above, the starting time of firmware for wireless LAN communication is reduced, so that the power consumption of a communication apparatus can be reduced.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-015981, filed Jan. 31, 2019 which is hereby incorporated by reference herein in its entirety.

What is claimed is:

1. A communication apparatus comprising a first communication unit configured to perform wireless LAN communication and a second communication unit configured to perform another communication different from the wireless LAN communication, comprising:
   a receiving unit configured to receive, from an other communication apparatus using the second communication unit, a request of information used when the other communication apparatus provides, by wireless LAN communication, the communication apparatus with a communication parameter necessary for performing communication with a wireless LAN access point using the first communication unit;

a first transmitting unit configured to, in response to the reception of the request by the receiving unit, transmitting the requested information to the other communication apparatus using the second communication unit; and a starting unit configured to start the first communication unit after the reception of the request by the receiving unit so that a communication using the communication parameter provided based on the request is performed by the first communication unit.

2. The apparatus according to claim 1, further comprising:
an instructing unit configured to instruct a start of processing for acquiring the communication parameter necessary for performing communication with the wireless LAN access point using the first communication unit; and a second transmitting unit configured to transmit, in response to an instruction by the instructing unit, a predetermined signal using the second communication unit in a state in which the first communication unit is not started, wherein the receiving unit receives the request from the other communication apparatus that has received the predetermined signal.

3. The apparatus according to claim 2, wherein the predetermined signal is information indicating a channel used when transmitting the request, and the receiving unit receives the request from the other communication apparatus in the channel.

4. The apparatus according to claim 1, further comprising:
an authenticating unit configured to execute an authentication process based on the information transmitted by the first transmitting unit; and an executing unit configured to execute a configuration process based on the information transmitted by the first transmitting unit.

5. The apparatus according to claim 4, wherein the authenticating unit executes an authentication process complying with a DPP (Device Provisioning Protocol) and the executing unit executes a configuration process complying with the DPP.

6. The apparatus according to claim 1, wherein
the first communication unit performs communication complying with an IEEE (The Institute of Electrical and Electronics Engineers, Inc.) 802.11 series standard; and the second communication unit performs communication complying with a BLE (Bluetooth Low Energy) standard.

7. A communication apparatus comprising a first communication unit configured to perform wireless LAN communication and a second communication unit configured to perform BLE communication, comprising:
a first receiving unit configured to receive an ADV_EXT_IND signal from an other communication apparatus using the second communication unit;

a transmitting unit configured to, if the ADV_EXT_IND signal is received by the first receiving unit, transmit an AUX_SCAN_REQ signal to the other communication apparatus in a channel based on channel information included in the ADV_EXT_IND signal regardless of whether an AUX_ADV_IND signal has been received from the other communication apparatus;

a second receiving unit configured to receive an AUX_SCAN_RSP signal from the other communication apparatus; and a providing unit configured to provide, using the first communication unit, the other communication apparatus with a communication parameter necessary for performing communication with a wireless LAN access point.

8. The apparatus according to claim 7, further comprising:
an authenticating unit configured to execute an authenticating process based on information received by the second receiving unit; and an executing unit configured to execute a configuration process based on information received by the second receiving unit.

9. The apparatus according to claim 8, wherein the authenticating unit executes an authentication process complying with a DPP (Device Provisioning Protocol) and the executing unit executes a configuration process complying with the DPP.

10. The apparatus according to claim 7, wherein the first communication unit performs communication complying with an IEEE (The Institute of Electrical and Electronics Engineers, Inc.) 802.11 series standard.

11. A control method of a communication apparatus comprising a first communication unit configured to perform wireless LAN communication and a second communication unit configured to perform another communication different from the wireless LAN communication, the method comprising:
receiving, from an other communication apparatus using the second communication unit, a request of information used when the other communication apparatus provides, by wireless LAN communication, the communication apparatus with a communication parameter necessary for performing communication with a wireless LAN access point using the first communication unit;

transmitting, in response to the reception of the request, the requested information to the other communication apparatus using the second communication unit; and starting the first communication unit after the reception of the request so that a communication using the communication parameter provided based on the request is performed by the first communication unit.

12. A control method of a communication apparatus comprising a first communication unit configured to perform wireless LAN communication and a second communication unit configured to perform BLE communication, the method comprising:
receiving an ADV_EXT_IND signal from an other communication apparatus using the second communication unit;

transmitting, if the ADV_EXT_IND signal is received, an AUX_SCAN_REQ signal to the other communication apparatus in a channel based on channel information included in the ADV_EXT_IND signal regardless of whether an AUX_ADV_IND signal has been received from the other communication apparatus;

receiving an AUX_SCAN_RSP signal from the other communication apparatus; and providing, using the first communication unit, the other communication apparatus with a communication parameter necessary for performing communication with a wireless LAN access point.

13. A non-transitory computer-readable storage medium storing a program for causing a computer to execute a control method of a communication apparatus comprising a first communication unit configured to perform wireless LAN communication and a second communication unit configured to perform another communication different from the wireless LAN communication, the method comprising:

receiving, from an other communication apparatus using the second communication unit, a request of information used when the other communication apparatus provides, by wireless LAN communication, the communication apparatus with a communication parameter necessary for performing communication with a wireless LAN access point using the first communication unit;

transmitting, in response to the reception of the request, the requested information to the other communication apparatus using the second communication unit; and starting the first communication unit after the reception of the request so that a communication using the communication parameter provided based on the request is performed by the first communication unit.

14. A non-transitory computer-readable storage medium storing a program for causing a computer to execute a control method of a communication apparatus comprising a first communication unit configured to perform wireless LAN communication and a second communication unit configured to perform BLE communication, the method comprising:

receiving an ADV_EXT_IND signal from an other communication apparatus using the second communication unit;

transmitting, if the ADV_EXT_IND signal is received, an AUX_SCAN_REQ signal to the other communication apparatus in a channel based on channel information included in the ADV_EXT_IND signal regardless of whether an AUX_ADV_IND signal has been received from the other communication apparatus;

receiving an AUX_SCAN_RSP signal from the other communication apparatus; and providing, using the first communication unit, the other communication apparatus with a communication parameter necessary for performing communication with a wireless LAN access point.

* * * * *